(12) United States Patent
Hamada (10) Patent No.: US 11,103,093 B2
(45) Date of Patent: Aug. 31, 2021

(54) VEHICLE VISUAL RECOGNITION DEVICE (71) Applicant: KABUSHIKI KAISHA TOKAI-RIKA-DENKI-SEISAKUSHO, Aichi-ken (JP)

(72) Inventor: Takehiro Hamada, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 378 days.

(21) Appl. No.: 16/208,941

(22) Filed: Dec. 4, 2018

(65) Prior Publication Data
US 2019/0176706 A1 Jun. 13, 2019

(30) Foreign Application Priority Data

Dec. 7, 2017 (JP) .............................. JP2017-235395

(51) Int. Cl.
*A47G 1/16* (2006.01)
*B60R 1/12* (2006.01)
*G10K 11/36* (2006.01)
*B60R 1/00* (2006.01)
*B60R 1/06* (2006.01)
*G02B 7/182* (2021.01)

(52) U.S. Cl.
CPC .............. *A47G 1/16* (2013.01); *B60R 1/006* (2013.01); *B60R 1/06* (2013.01); *B60R 1/12* (2013.01); *G02B 7/182* (2013.01); *G10K 11/36* (2013.01)

(58) Field of Classification Search
CPC .. A47G 1/16; B60R 1/006; B60R 1/06; B60R 1/12; G02B 7/182; G10K 11/36
USPC ........................................................ 359/872
See application file for complete search history.

(56) References Cited

U.S. PATENT DOCUMENTS

| 5,966,254 A * | 10/1999 | Flowers ..................... B60R 1/06 359/841 |
| 2009/0279195 A1 | 11/2009 | Itoh et al. |
| 2012/0188662 A1* | 7/2012 | Hamada ..................... B60R 1/06 359/871 |

FOREIGN PATENT DOCUMENTS

| JP | H02-024720 U | 2/1990 |
| JP | 2007308074 A * | 11/2007 |
| JP | 2009-269580 A | 11/2009 |
| JP | 2012-153198 A | 8/2012 |

(Continued)

OTHER PUBLICATIONS

Office Action dated Mar. 23, 2021 issued in corresponding Japanese Patent Application No. 2017-235395.

*Primary Examiner* — Eret C McNichols
*Assistant Examiner* — Ding Y Tan
(74) *Attorney, Agent, or Firm* — Roberts Calderon Safran & Cole, P.C.

(57) ABSTRACT

Wind noise is suppressed from occurring in a gap between a support body and a housing body, without obstructing movement of the housing body with respect to the support body. An outer mirror device includes a mirror that assists visual recognition by an occupant of a vehicle, a visor that houses the mirror, a base that supports the visor such that the visor is capable of moving, and a seal member that is provided to the base. The seal member is separated from the visor when a speed of the vehicle is a predetermined speed or lower, and abuts the visor when the speed of the vehicle exceeds the predetermined speed so as to seal at least part of a space between the visor and the base.

14 Claims, 10 Drawing Sheets

(56) References Cited

FOREIGN PATENT DOCUMENTS

JP 2014-073722 A 4/2014

\* cited by examiner

VEHICLE VISUAL RECOGNITION DEVICE

CROSS-REFERENCE TO RELATED APPLICATION

This application claims priority under 35 USC 119 from Japanese Patent Application No. 2017-235395 filed Dec. 7, 2017, the disclosure of which is incorporated by reference herein.

BACKGROUND

Field of the Invention

The present disclosure relates to a vehicle visual recognition device.

Related Art

Japanese Patent Application Laid-Open (JP-A) No. 2009-269580 discloses an outer mirror (vehicle visual recognition device) provided in the vicinity of a side door of a vehicle. The outer mirror described in JP-A No. 2009-269580 includes a mirror base (support body) fixed to the side door or the like, a mirror (visual recognition section) that assists visual recognition by a vehicle occupant, a housing (housing body) that houses the mirror and that is capable of rotating with respect to the mirror base, and a wind blocking member that seals a gap between the mirror base and the housing. Providing the wind blocking member prevents a whistling sound (wind noise) from occurring in the gap between the mirror base and the housing.

The housing moves (rotates) with respect to the mirror base. Accordingly, it is desirable to be able to suppress wind noise from occurring in the gap between the mirror base and the housing without obstructing movement of the housing with respect to the mirror base.

SUMMARY

In consideration of the above circumstances, a vehicle visual recognition device is obtained that is capable of suppressing wind noise from occurring in a gap between a support body and a housing body without obstructing movement of the housing body with respect to the support body.

A vehicle visual recognition device according to a first aspect includes: a visual recognition section that assists visual recognition by an occupant of a vehicle; a housing body that houses the visual recognition section; a support body that supports the housing body such that the housing body is movable; and a seal body that is provided to one of the housing body or the support body, that is separated from another of the housing body or the support body in a case in which a speed of the vehicle is a predetermined speed or lower, and that abuts (contacts) the other of the housing body or the support body in a case in which the speed of the vehicle exceeds the predetermined speed so as to seal at least part of a space between the housing body and the support body.

A vehicle visual recognition device according to a second aspect is the vehicle visual recognition device of the first aspect, wherein the seal body includes an anchored portion that is anchored to the one of the housing body or the support body, and a sealing portion that extends from a side of the anchored portion toward the other of the housing body or the support body.

A vehicle visual recognition device according to a third aspect is the vehicle visual recognition device of the second aspect, wherein the anchored portion is harder than the sealing portion.

A vehicle visual recognition device according to a fourth aspect is the vehicle visual recognition device of either the second aspect or the third aspect, wherein the sealing portion is inclined toward a vehicle front side on progression toward the other of the housing body or the support body, as viewed in a cross-section along a vehicle front-rear direction and a vehicle up-down direction.

A vehicle visual recognition device according to a fifth aspect is the vehicle visual recognition device of any one of the second aspect to the fourth aspect, wherein the sealing portion is curved toward the other of the housing body or the support body, as viewed in a cross-section along a vehicle front-rear direction and a vehicle up-down direction.

A vehicle visual recognition device according to a sixth aspect is the vehicle visual recognition device of any one of the first aspect to the fifth aspect, wherein the seal body is fixed to the support body.

In the vehicle visual recognition device according to the first aspect, the seal body is provided to the one of the housing body or the support body. The seal body is separated from the other of the housing body or the support body in a case in which the vehicle speed is the predetermined speed or lower. Even when the housing body is moved with respect to the support body in this state, the seal body does not slide (rub) against the other of the housing body or the support body. This enables movement of the housing body with respect to the support body to be prevented or suppressed from being obstructed by the seal body. Moreover, the seal body abuts the other of the housing body or the support body when the vehicle speed exceeds the predetermined speed, such that at least part of the space between the housing body and the support body is sealed by the seal body. As a result, traveling airflow is suppressed from entering the gap between the support body and the housing body, enabling wind noise occurring in the gap between the support body and the housing body to be suppressed.

In the vehicle visual recognition device according to the second aspect, the anchored portion of the seal body is anchored to the one of the housing body or the support body, thereby enabling the seal body to be attached to the one of the housing body or the support body. Moreover, the sealing portion abuts the other of the housing body or the support body when receiving traveling airflow of the vehicle, enabling at least part of the space between the housing body and the support body to be sealed by the seal body.

In the vehicle visual recognition device according to the third aspect, the anchored portion of the seal body anchored to the one of the housing body or the support body is harder than the sealing portion, enabling the seal body to be attached to the one of the housing body or the support body in a more stable state.

In the vehicle visual recognition device according to the fourth aspect, the sealing portion of the seal body is inclined toward the vehicle front side on progression toward the other of the housing body or the support body. As a result, an end portion of the sealing portion on the opposite side to the anchored portion can be encouraged to abut the other of the housing body or the support body when the sealing portion of the seal body receiving traveling airflow.

In the vehicle visual recognition device according to the fifth aspect, the sealing portion of the seal body is curved toward the other of the housing body or the support body. As a result, the end portion of the sealing portion on the opposite side to the anchored portion can be further encouraged to abut the other of the housing body or the support body when the sealing portion of the seal body receiving traveling airflow.

In the vehicle visual recognition device according to the sixth aspect, the seal body is fixed to the support body, such that the seal body does not move when the housing body moves with respect to the support body. This enables the seal body to be prevented or suppressed from becoming moved (displaced) with respect to the support body when the housing body moves with respect to the support body.

BRIEF DESCRIPTION OF THE DRAWINGS

An exemplary embodiment will be described in detail with reference to the following figures, wherein.

DETAILED DESCRIPTION

Explanation follows regarding an outer mirror device serving as a vehicle visual recognition device (visual recognition device for a vehicle), with reference to FIG. 1 to FIG. 7. In the drawings, the arrow FR, the arrow OUT, and the arrow UP respectively indicate a vehicle front direction, vehicle width direction outside, and vehicle upper side of a vehicle provided with the outer mirror device, as appropriate. Moreover, in the following explanation, reference simply to the front, rear, up, and down (lower) directions refers to the front and rear in the vehicle front-rear direction and up and down in the vehicle up-down (upper-lower) direction, unless specifically stated otherwise.

Figure 1:
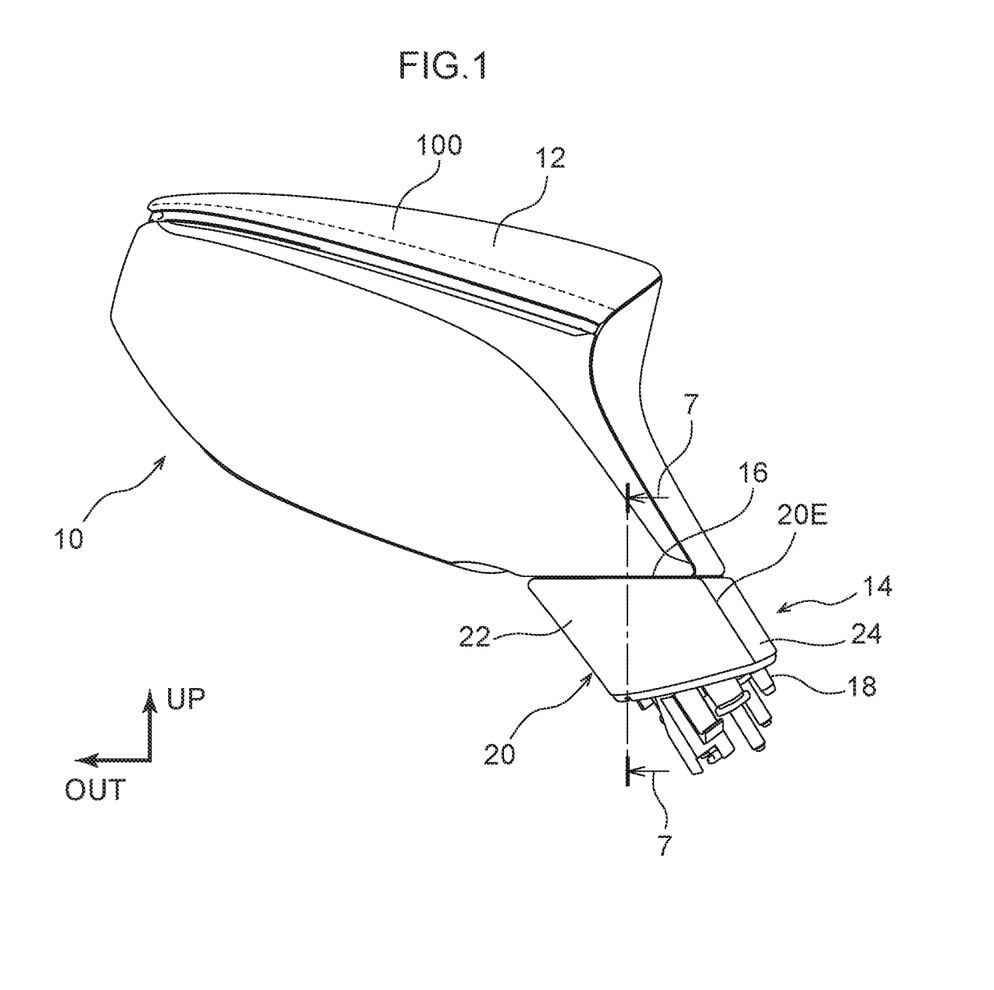
FIG. 1 is a front view illustrating an outer mirror device.

As illustrated in FIG. 1, an outer mirror device 10 of the present exemplary embodiment is supported at the exterior of a front side door of a vehicle, not illustrated in the drawings. The outer mirror device 10 assists visual recognition by a vehicle occupant with a mirror 100, serving as a visual recognition section. Specifically, the outer mirror device 10 includes a visor 12, serving as a housing body that houses the mirror 100, a base 14, serving as a support body that supports the visor 12 such that the visor 12 is capable of moving, and a seal member 16, serving as a seal body attached to the base 14. Note that a camera that assists visual recognition by the occupant by image capture may be provided instead of the mirror 100.

Figure 7:
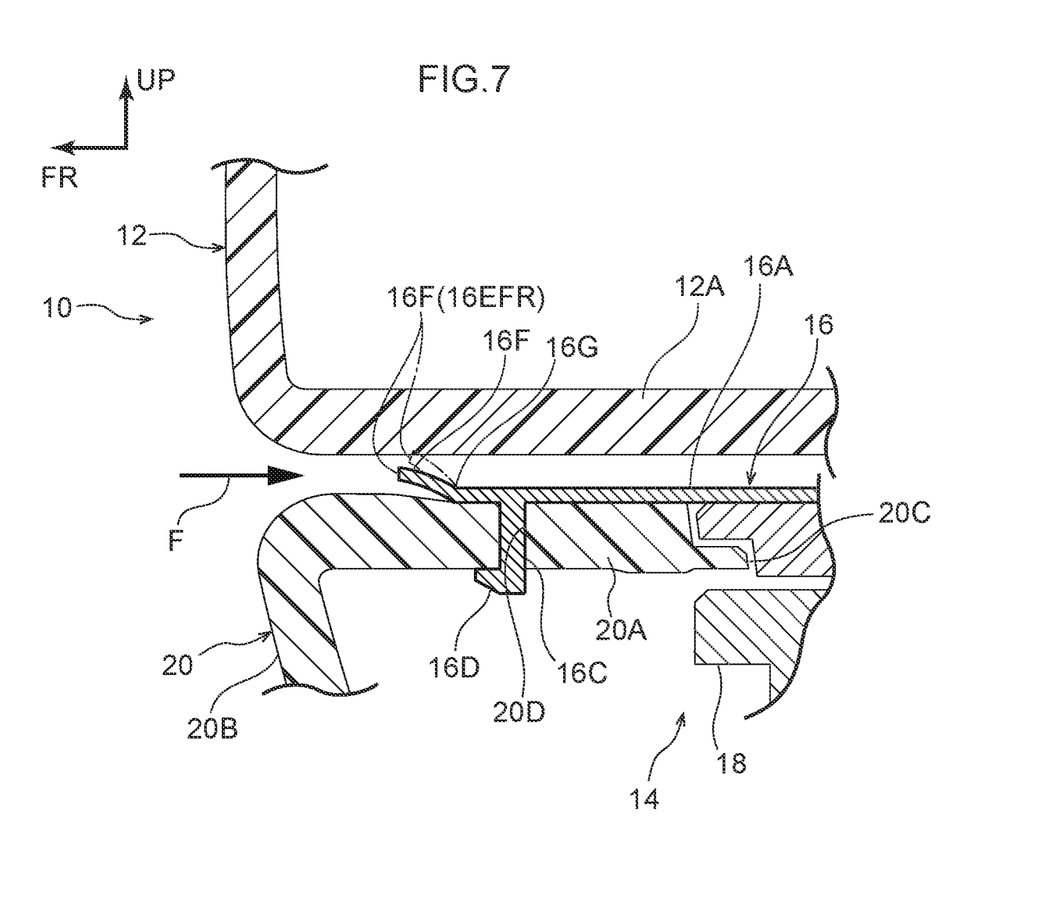
FIG. 7 is an enlarged cross-section illustrating part of an outer mirror device sectioned along line 7-7 in FIG. 1.

The visor 12 is formed in a box shape with an internal space in which the mirror 100 or the like is disposed. The base 14 side of the visor 12 is supported by a stand, not illustrated in the drawings. Note that as illustrated in FIG. 7, a portion of the visor 12, surrounding a lower end of the stand, is referred to as a bottom wall portion 12A. The stand is fixed to the base 14 so as to be capable of moving (capable of rotating) so as to tilt the visor 12 in the front-rear direction with respect to the base 14. Tilting of the visor 12 with respect to the base 14 may be performed electrically, or may be performed by hand. FIG. 1 illustrates a state in which the visor 12 is positioned at a neutral position. In this state, the vehicle occupant is able to visually recognize an oblique rear side of the vehicle using the mirror. Moreover, the visor 12 is disposed at a housed (stored) position by tilting the visor 12 with respect to the base 14. In this state, the visor 12 is suppressed from projecting out with respect to the front side door.

Figure 2:
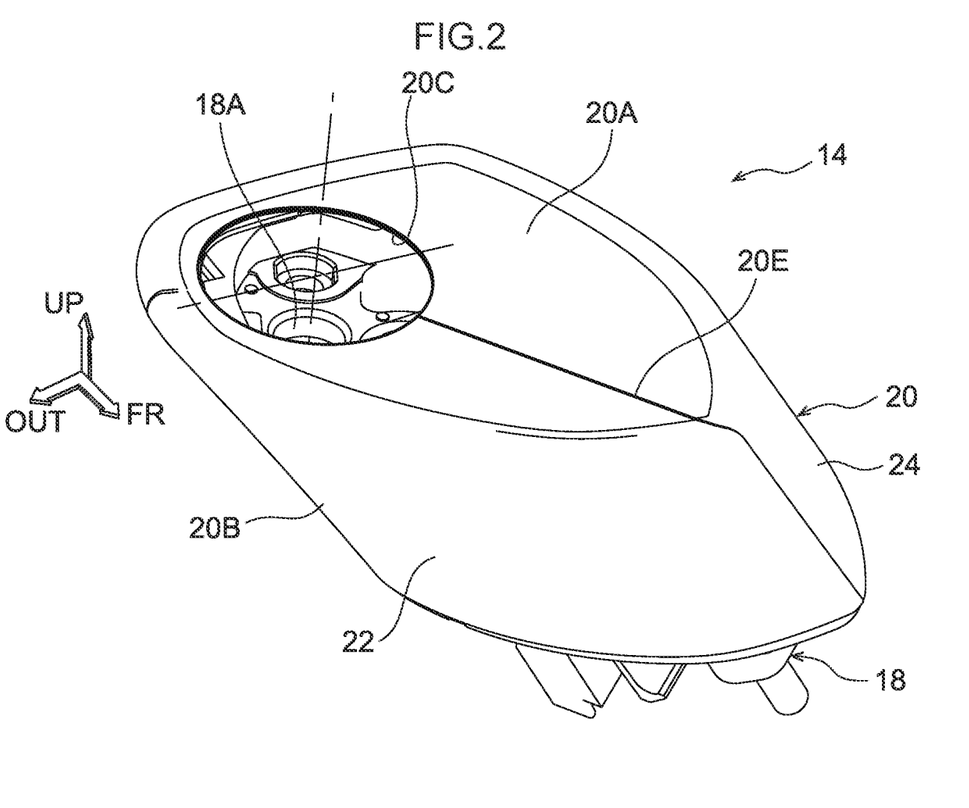
FIG. 2 is a perspective view illustrating a base.

As illustrated in FIG. 2, the base 14 is structured including a base body 18, and a base cover 20 attached to the base body 18 so as to cover the base body 18. The stand mentioned above is fixed to the base body 18 so as to be capable of rotating. The base body 18 is formed with a wiring insertion hole 18A through which wiring, not illustrated in the drawings, that supplies power to a motor for tilting the visor 12 with respect to the base 14, is inserted.

As illustrated in FIG. 2 and FIG. 7, the base cover 20 includes an apex wall portion 20A disposed opposing the bottom wall portion 12A of the visor 12 and extending substantially parallel to the bottom wall portion 12A, and a side wall portion 20B covering the lateral side of the base body 18. Note that in the present exemplary embodiment, the visor cover 20 has a split structure by an outside cover portion 22 structuring a vehicle width direction outside portion of the visor cover 20, and an inside cover portion 24 structuring a vehicle width direction inside portion of the visor cover 20. The apex wall portion 20A is formed with an opening 20C to enable connection of the base body 18 to the stand, not illustrated in the drawings, and anchor holes 20D to which anchor hook portions 16C of the seal member 16, described later, are anchored (caught). Note that the anchor holes 20D are omitted from illustration in FIG. 2.

Figure 3:
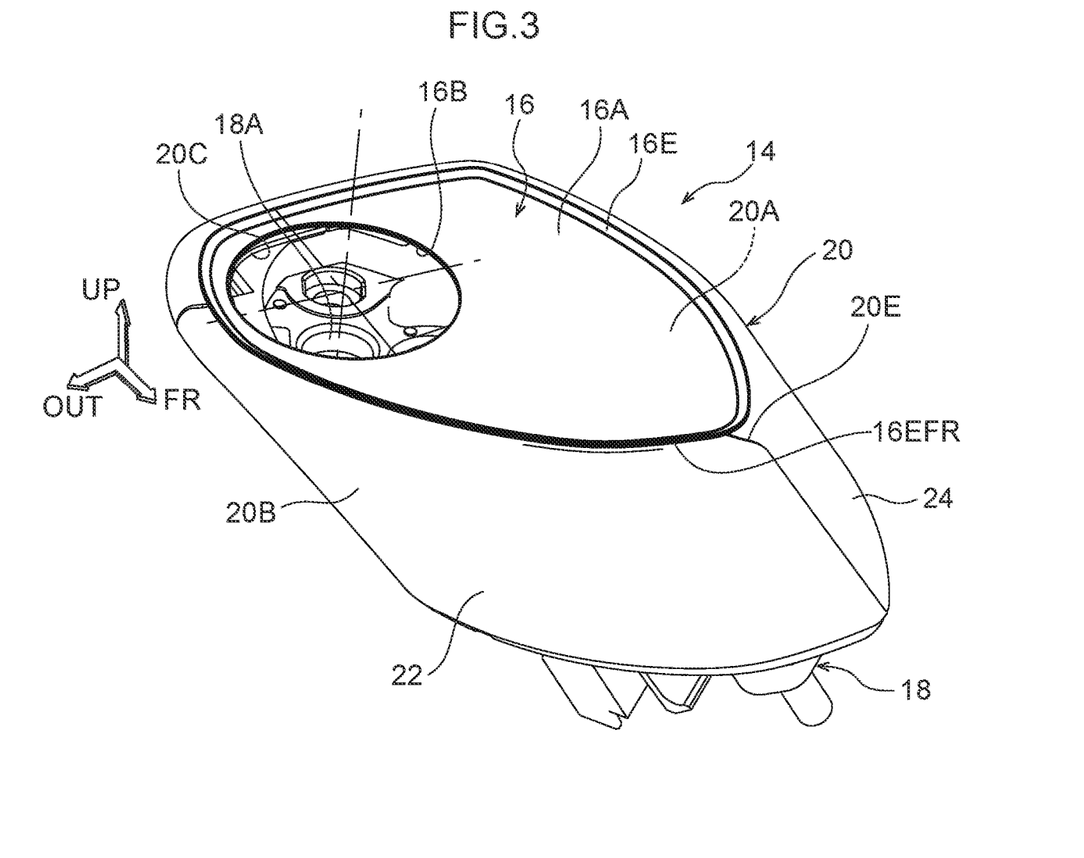
FIG. 3 is a perspective view corresponding to FIG. 2, illustrating a base with a seal member attached.
Figure 4:
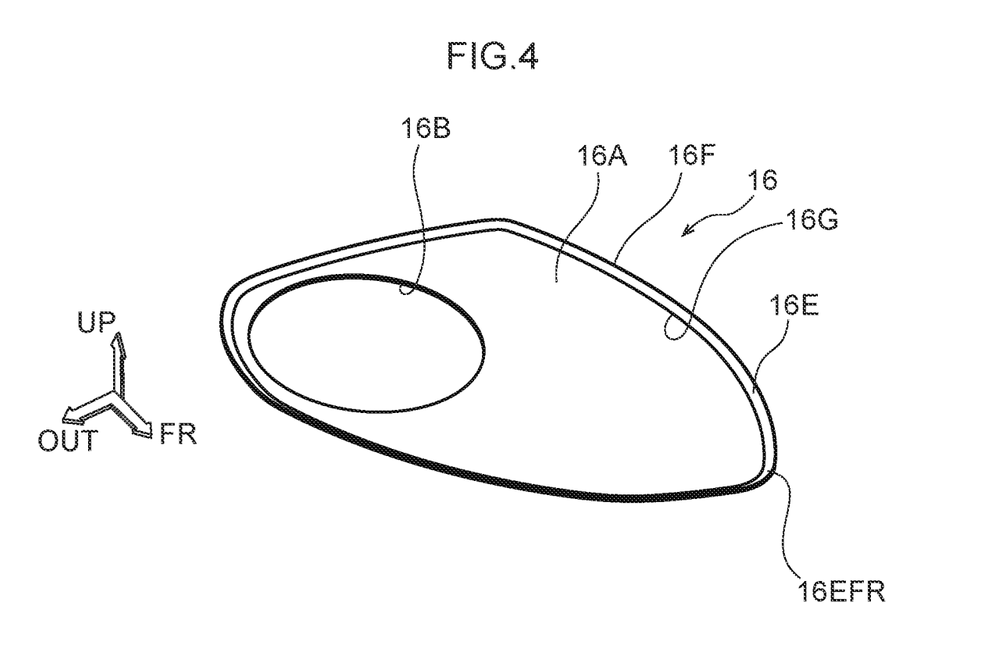
FIG. 4 is a perspective view illustrating a seal member.
Figure 5:
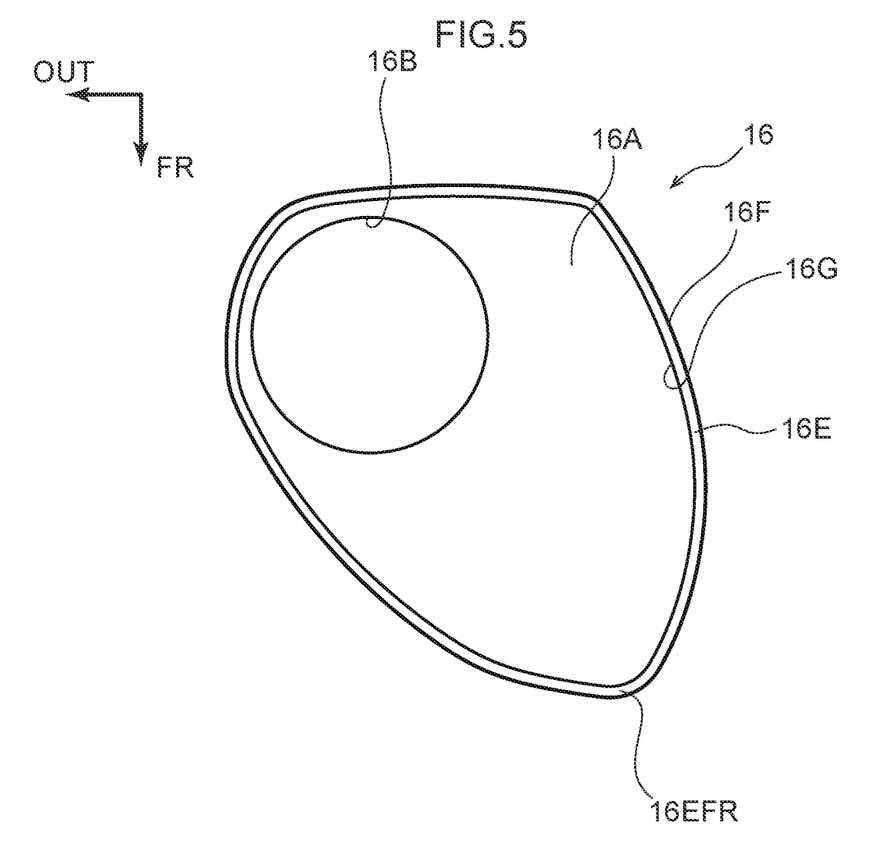
FIG. 5 is a plan view illustrating a seal member.

As illustrated in FIG. 3 and FIG. 4, the seal member 16 attached to the base 14 is formed from a raw material having viscoelasticity such as rubber. Specifically, as illustrated in FIG. 4, FIG. 5, and FIG. 7, the seal member 16 includes a base plate portion 16A disposed following the apex wall portion 20A of the visor cover 20. The base plate portion 16A is set such that thickness dimensions of each part of the base plate portion 16A have a substantially uniform thickness dimension. The external profile of the base plate portion 16A as viewed along its thickness direction is a profile corresponding to the apex wall portion 20A of the visor cover 20, set with slightly smaller dimensions than the dimension of the apex wall portion 20A. A portion of the base plate portion 16A corresponding to a connection portion between the stand, not illustrated in the drawings, and the base body 18 is formed with a circular opening 16B.

Figure 6:
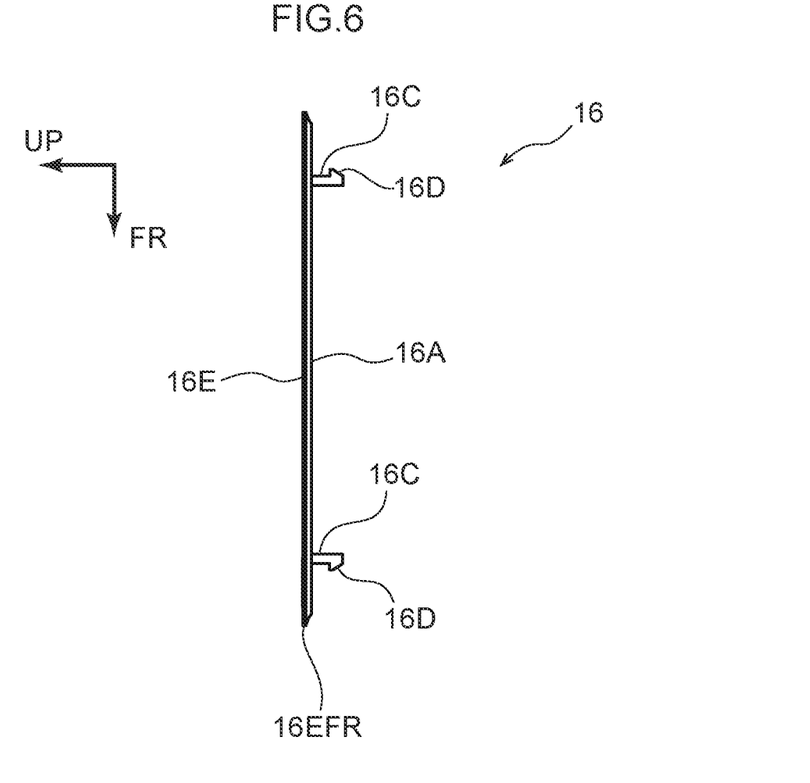
FIG. 6 is a side view illustrating a seal member.

As illustrated in FIG. 6 and FIG. 7, the seal member 16 includes plural of the anchor hook (anchor claw) portions 16C, serving as an anchored (caught) portion. Each anchor hook portion 16C projects from the base plate portion 16A toward the apex wall portion 20A of the base cover 20, and is bent in an L-shape at a projection direction leading end side. In the present exemplary embodiment, two of the anchor hook portions 16C are provided, disposed spaced apart from each other in the front-rear direction. The anchor hook portions 16C are inserted into the anchor holes 20D formed in the apex wall portion 20A of the base cover 20, thereby fixing the seal member 16 to the base cover 20 in a state in which the base plate portion 16A is disposed following the apex wall portion 20A of the base cover 20. Note that in a state in which the seal member 16 is fixed to the base cover 20, as illustrated in FIG. 3, the base plate portion 16A covers part of a boundary 20E between the outside cover portion 22 and the inside cover portion 24 structuring the base cover 20. Moreover, as illustrated in FIG. 7, in a state in which the anchor hook portions 16C are inserted into the anchor holes 20D formed in the apex wall portion 20A of the base cover 20, leading end portions 16D of the anchor hook portions 16C are disposed on the base body 18 side with respect to the apex wall portion 20A of the base cover 20. Accordingly, in a fully inserted state of the anchor hook portions 16C into the anchor holes 20D, the anchor hook portions 16C are suppressed from coming out from the anchor holes 20D, thereby suppressing the seal member 16 from detaching from the base cover 20. Moreover, in the present exemplary embodiment, the seal member 16 is molded by two-color molding or the like, such that the base plate portion 16A and the anchor hook portions 16C are harder than a sealing portion 16E, described below.

As illustrated in FIG. 4, FIG. 6, and FIG. 7, the seal member 16 includes the sealing portion 16E extending from an outer peripheral edge of the base plate portion 16A toward the bottom wall portion 12A side of the visor 12. In the present exemplary embodiment, the sealing portion 16E is provided around the entire periphery of the outer peripheral edge of the base plate portion 16A. Note that configuration may be made in which the sealing portion 16E is only provided to a front side portion of the outer peripheral edge of the base plate portion 16A. The sealing portion 16E is inclined substantially in a radial (outer) direction of the base plate portion 16A on progression from the base plate portion 16A side toward the bottom wall portion 12A side of the visor 12, and is curved in a substantially convex profile toward the bottom wall portion 12A side of the visor 12. Note that dimensions and the like of the sealing portion 16E are set such that in an assembled state of the outer mirror device 10 (the state illustrated in FIG. 1), when the vehicle is not traveling, a leading end portion 16F of the sealing portion 16E (an end portion on the opposite side to the base plate portion 16A) is separated from the bottom wall portion 12A of the visor 12.

FIG. 7 illustrates an enlarged partial cross-section of the outer mirror device 10, sectioned along the front-rear direction and the up-down direction. As illustrated in FIG. 7, a portion of the sealing portion 16E at a front side (a front side portion 16EFR of the sealing portion 16E) is inclined toward the vehicle front side on progression from the base plate portion 16A side toward the bottom wall portion 12A side of the visor 12. In the present exemplary embodiment, when traveling airflow F, which is from front side to rear side, hits the front side portion 16EFR of the sealing portion 16E, the sealing portion 16E tilts toward the rear side about a base end portion 16G of the sealing portion 16E (end portion of the sealing portion 16E on the base plate portion 16A side) as center of tilting (rotation), and the leading end portion 16F of the sealing portion 16E abuts (contacts) the bottom wall portion 12A of the visor 12.

Operation and Advantageous Effects of Present Exemplary Embodiment

Explanation follows regarding operation and advantageous effects of the present exemplary embodiment.

As illustrated in FIG. 1, in a state in which the visor 12 is positioned at the neutral position, the vehicle occupant is able to visually recognize the oblique rear side of the vehicle using the mirror.

In a stationary (stop) state of the vehicle equipped with the outer mirror device 10 of the present exemplary embodiment, as illustrated by the solid line in FIG. 7, the leading end portion 16F of the sealing portion 16E of the seal member 16 is separated from the bottom wall portion 12A of the visor 12. Accordingly, when housing (storing) the visor 12 at the housed position from the neutral position, or when deploying the visor 12 from the housed position to the neutral position, the leading end portion 16F of the sealing portion 16E of the seal member 16 does not slide (rub) against the bottom wall portion 12A of the visor 12. The present exemplary embodiment thereby enables the seal member 16 to be prevented or suppressed from obstructing the visor 12 when being housed or deployed.

When the vehicle equipped with the outer mirror device 10 of the present exemplary embodiment is in a traveling state, the front side-to-rear side traveling airflow F hits the front side portion 16EFR of the sealing portion 16E. When the vehicle speed exceeds a predetermined speed, as illustrated by the single-dotted dashed line, the sealing portion 16E of the seal member 16 tilts and the leading end portion 16F of the sealing portion 16E abuts the bottom wall portion 12A of the visor 12. A vehicle front side portion between the visor 12 and the base cover 20 is thus sealed by the sealing portion 16E of the seal member 16. As a result, the traveling airflow is suppressed from entering a gap between the base cover 20 and the visor 12, enabling wind noise occurring in the gap between the base cover 20 and the visor 12 to be suppressed. Note that the predetermined speed described above is a speed at which wind noise occurring in the gap between the base cover 20 and the visor 12 would become annoying in a case in which the seal member 16 is not provided, and is, for example, a speed of around 100 km/h. Note that wind noise may become annoying even at speeds lower than 100 km/h, depending on the shape and so on of the base cover 20 and the visor 12. The hardness, thickness, shape, and the like of the sealing portion 16E are set such that the sealing portion 16E of the seal member 16 tilts and the leading end portion 16F of the sealing portion 16E abuts the bottom wall portion 12A of the visor 12 at the predetermined speed. In the present exemplary embodiment as an example, the front side portion 16EFR of the sealing portion 16E is inclined toward the vehicle front side on progression from the base plate portion 16A side toward the bottom wall portion 12A side of the visor 12 (is inclined substantially in a radial direction of the base plate portion 16A), and is curved in a substantially convex profile toward the bottom wall portion 12A side of the visor 12. Accordingly, when the traveling airflow F hits the front side portion 16EFR of the sealing portion 16E, the pressure difference between the front side and the rear side of the front side portion 16EFR of the sealing portion 16E can be increased. As a result, the leading end portion 16F of the sealing portion 16E can be encouraged to abut the bottom wall portion 12A of the visor 12 at a lower speed.

Moreover, in the present exemplary embodiment, the anchor hook portion 16C of the seal member 16 is inserted into the anchor hole 20D formed in the apex wall portion 20A, enabling the seal member 16 to be fixed to the base cover 20. Namely, the seal member 16 can be fixed to the base cover 20 without using a tool. In the present exemplary embodiment, the anchor hook portions 16C and the base plate portion 16A are harder than the sealing portion 16E in the seal member 16, enabling the seal member 16 to be fixed to the base cover 20 in a more stable state.

Moreover, in the present exemplary embodiment, the seal member 16 is fixed to the base cover 20. In this configuration, the seal member 16 does not move when housing the visor 12 from the neutral position to the housed position, nor when deploying the visor 12 from the housed position to the neutral position. This thereby enables the seal member 16 to be suppressed from becoming moved (displaced) with respect to the base 14 (base cover 20) accompanying movement of the visor 12.

Moreover, as illustrated in FIG. 3, in the present exemplary embodiment, in a state in which the seal member 16 is fixed to the base cover 20, the base plate portion 16A of the seal member 16 covers part of the boundary 20E between the outside cover portion 22 and the inside cover portion 24 structuring the base cover 20. This thereby enables the noise of wind passing over a step at the boundary 20E between the outside cover portion 22 and the inside cover portion 24 to be prevented or suppressed.

Note that in the present exemplary embodiment, explanation has been given regarding an example in which the seal member 16 is fixed to the base cover 20. However, the present disclosure is not limited thereto. For example, it is possible that the seal member 16 is fixed to the visor 12.

Figure 8:
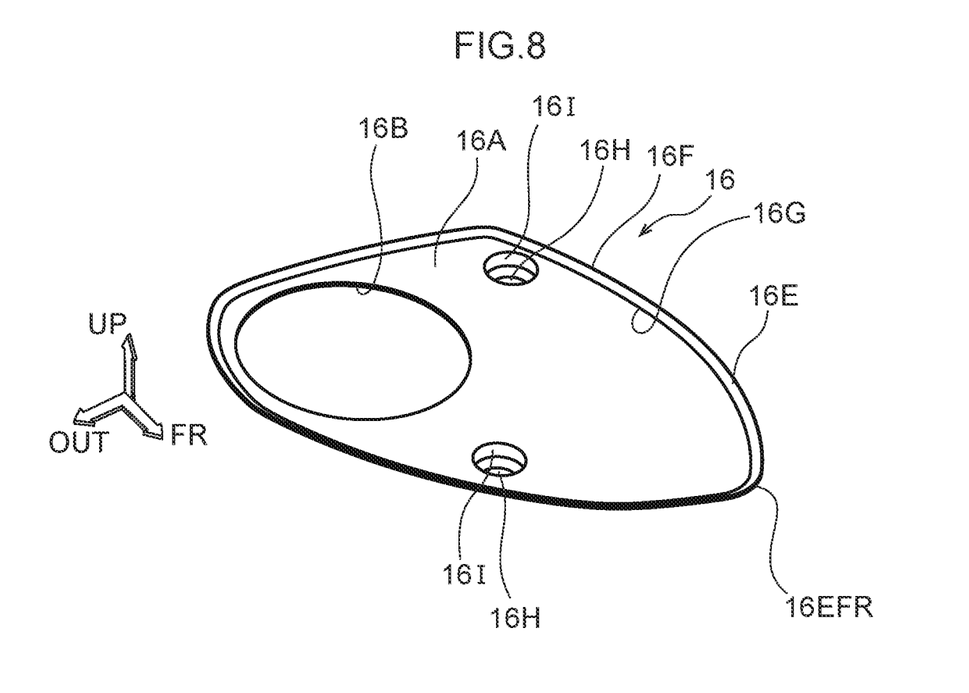
FIG. 8 is a perspective view corresponding to FIG. 4, illustrating a seal member of another exemplary embodiment.
Figure 9:
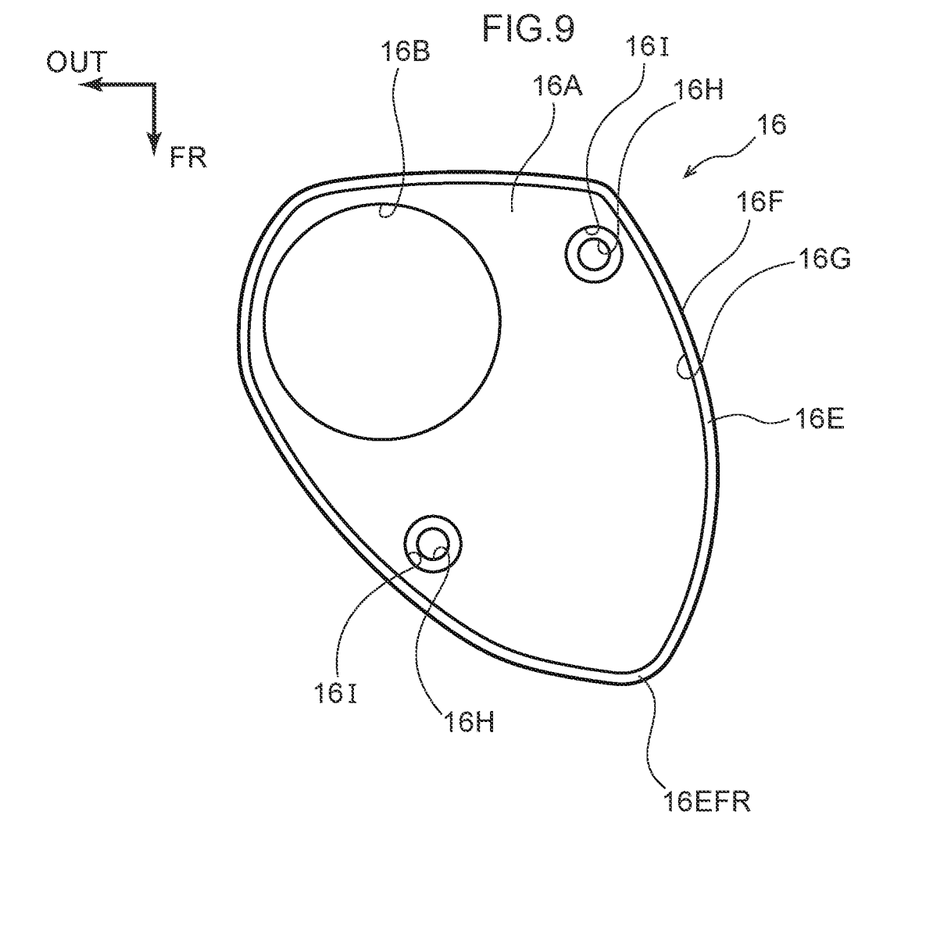
FIG. 9 is a plan view corresponding to FIG. 5, illustrating a seal member.
Figure 10:
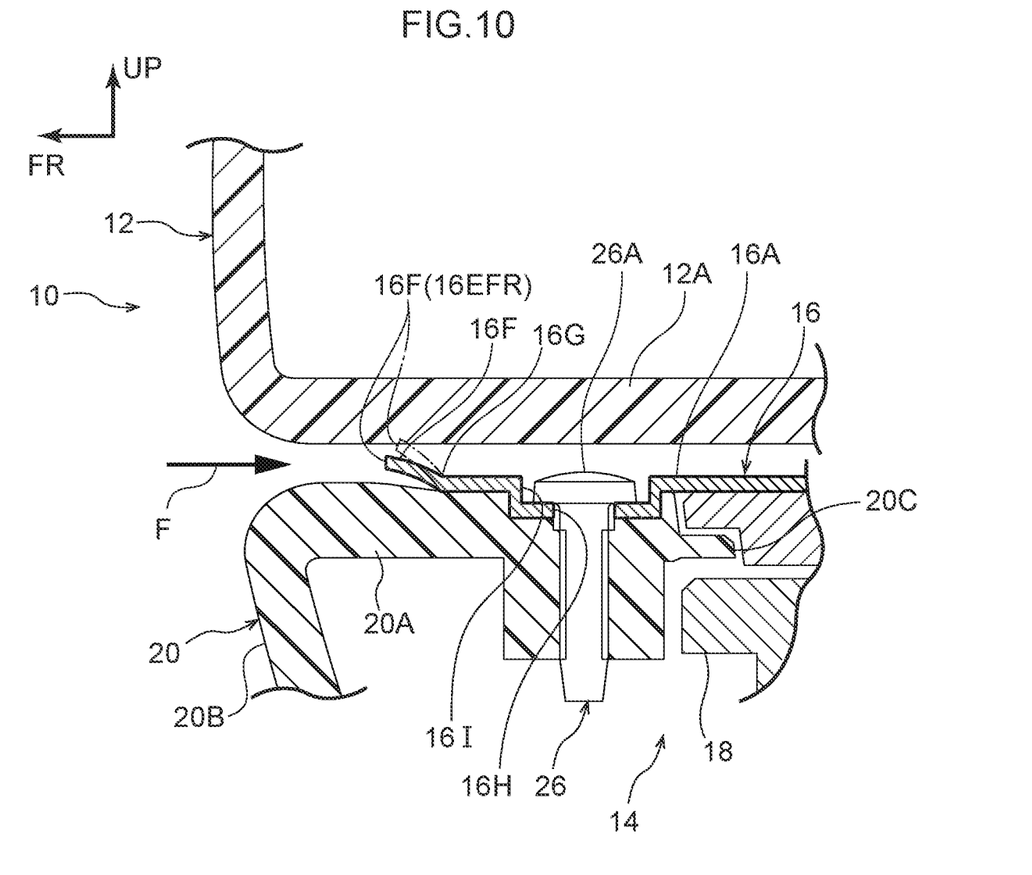
FIG. 10 is an enlarged cross-section corresponding to FIG. 7, illustrating part of an outer mirror device including a seal member of another exemplary embodiment.

In the present exemplary embodiment, explanation has been given regarding an example in which the anchor hook portions 16C and the base plate portion 16A are harder than the sealing portion 16E in the seal member 16. However, the present disclosure is not limited thereto. Whether or not to vary the hardness of the respective portions of the seal member 16 may be decided as appropriate in consideration of the manner of attachment of the seal member 16 to the base cover 20 or the like. For example, as illustrated in FIG. 8 to FIG. 10, in a configuration in which the seal member 16 is joined to the base cover 20 using tapping screws 26, there is no need to make different the hardness of the respective portions of the seal member 16. In such a configuration, insertion holes 16H for insertion of the tapping screws 26 and indentations 16I in which head portions 26A of the tapping screws 26 are disposed are formed in the base plate portion 16A of the seal member 16.

Explanation has been given regarding an exemplary embodiment. However, the present disclosure is not limited to the above, and obviously various other modifications may be implemented within a range not departing from the spirit of the present disclosure.

What is claimed is:

1. A vehicle visual recognition device, comprising:
   a visual recognition section that assists visual recognition by an occupant of a vehicle;
   a housing body that houses the visual recognition section;
   a support body that supports the housing body such that the housing body is movable; and
   a seal body that is provided at a space between the housing body and the support body, and is configured to seal at least part of a space between the housing body and the support body,
   wherein:
   the seal body includes a fixed portion that is fixed to one of the housing body or the support body, and a sealing portion that extends from the fixed portion toward the other of the housing body or the support body so as to be tiltable with respect to the fixed portion due to airflow (F) hitting the sealing portion such that
   the sealing portion is disposed such that in a state in which the vehicle is stopped, a leading end portion of the sealing portion is positioned so as to be separated from the other of the housing body or the support body; and
   in a state in which the vehicle is moving, the sealing portion is configured to seal the at least part of the space between the housing body and the support body due to the leading end portion abutting the other of the housing body or the support body by the sealing portion being tilted with respect to the fixed portion due to airflow (F) hitting the sealing portion.

2. The vehicle visual recognition device of claim 1, wherein the fixed portion includes an anchored portion that is anchored to the one of the housing body or the support body.

3. The vehicle visual recognition device of claim 2, wherein the anchored portion is harder than the sealing portion.

4. The vehicle visual recognition device of claim 1, wherein the sealing portion is inclined toward a vehicle front side on progression toward the other of the housing body or the support body, as viewed in a cross-section along a vehicle front-rear direction and a vehicle up-down direction.

5. The vehicle visual recognition device of claim 3, wherein the sealing portion is inclined toward a vehicle front side on progression toward the other of the housing body or the support body, as viewed in a cross-section along a vehicle front-rear direction and a vehicle up-down direction.

6. The vehicle visual recognition device of claim 1, wherein the sealing portion is curved toward the other of the housing body or the support body, as viewed in a cross-section along a vehicle front-rear direction and a vehicle up-down direction.

7. The vehicle visual recognition device of claim 4, wherein the sealing portion is curved toward the other of the housing body or the support body, as viewed in a cross-section along a vehicle front-rear direction and a vehicle up-down direction.

8. The vehicle visual recognition device of claim 5, wherein the sealing portion is curved toward the other of the housing body or the support body, as viewed in a cross-section along a vehicle front-rear direction and a vehicle up-down direction.

9. The vehicle visual recognition device of claim 1, wherein the fixed portion is fixed to the support body.

10. The vehicle visual recognition device of claim 2, wherein the fixed portion is fixed to the support body.

11. The vehicle visual recognition device of claim 5, wherein the fixed portion is fixed to the support body.

12. The vehicle visual recognition device of claim 1, wherein in the state in which the vehicle is moving, the sealing portion is configured to seal the at least part of the space between the housing body and the support body due to the leading end portion abutting the other of the housing body or the support body by the sealing portion being tilted toward a vehicle rear side due to airflow from a vehicle front side hitting the sealing portion.

13. The vehicle visual recognition device of claim 4, wherein in the state in which the vehicle is moving, the sealing portion is configured to seal the at least part of the space between the housing body and the support body due to the leading end portion abutting the other of the housing body or the support body by the sealing portion being tilted toward a vehicle rear side due to airflow from the vehicle front side hitting the sealing portion.

14. The vehicle visual recognition device of claim 1, wherein the fixed portion is harder than the sealing portion.

* * * * *